June 6, 1972  V. W. ADAMSKI ET AL  3,667,818
HEAVY DUTY CASTER AXLE AND INTEGRAL FITTING
Filed Oct. 19, 1970
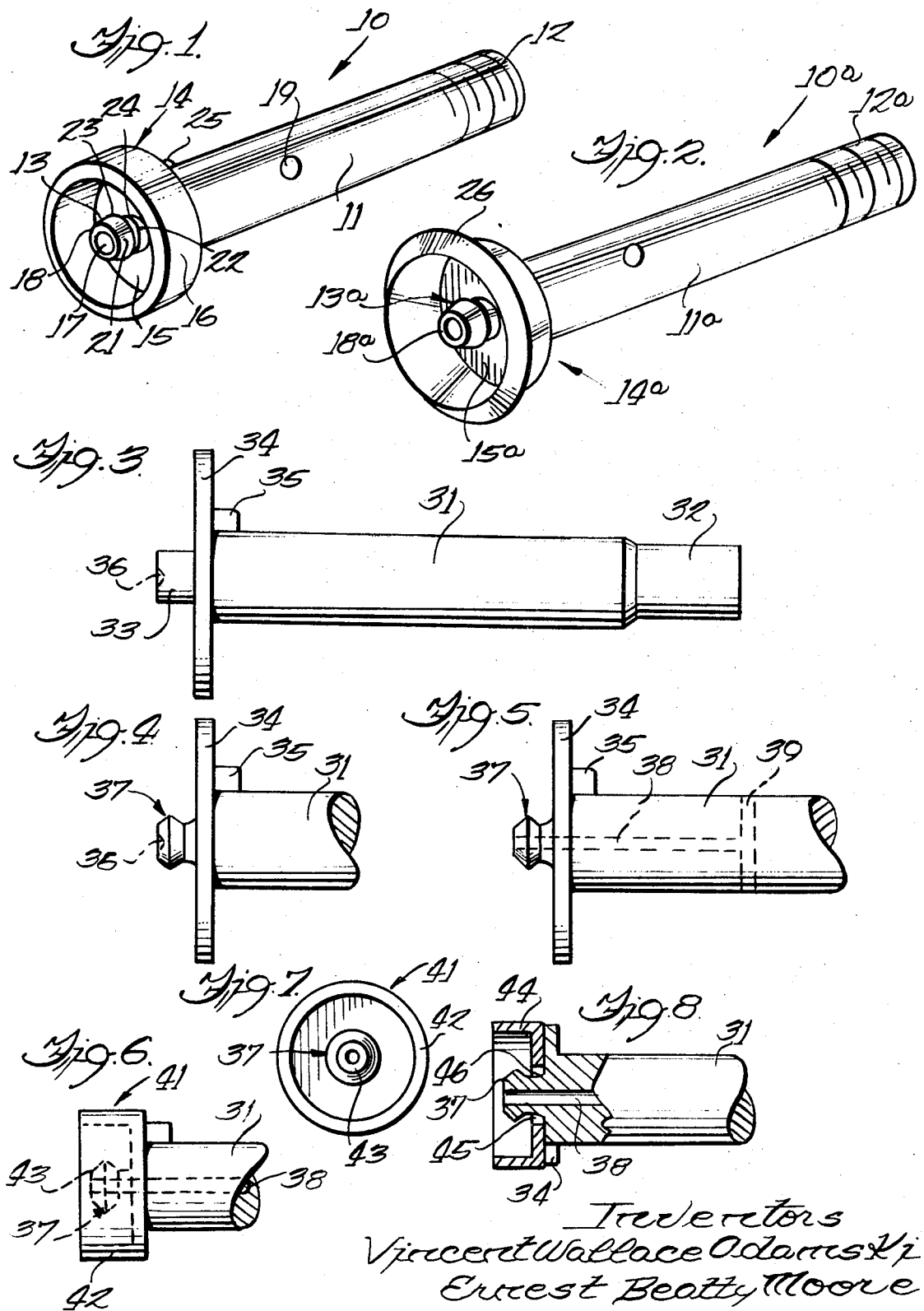

United States Patent Office 3,667,818
Patented June 6, 1972

3,667,818
HEAVY DUTY CASTER AXLE AND INTEGRAL FITTING
Vincent Wallace Adamski and Ernest Beatty Moore, Greenville, Miss., assignors to Keystone Consolidated Industries, Inc., Peoria, Ill.
Filed Oct. 19, 1970, Ser. No. 81,644
Int. Cl. F16c 1/24
U.S. Cl. 308—92                                   4 Claims

ABSTRACT OF THE DISCLOSURE

A heavy duty caster axle having an integral grease fitting formed at one end protected by a radially and forwardly extending annular flange which substantially encompasses the grease fitting. An axial passage is formed through the grease fitting and extends into the axle to terminate in a diametrically extending passage opening to the exterior surface thereof. The axle and fitting are formed from a cylindrical blank by the steps of forming an enlarged radial flange spaced from one end of the blank, forming the end of the blank at the flange to provide the outline of the fitting, drilling an axial passage into the formed end and shank and a transverse passage, and either forming the flange into a protective cup or attaching a protective cup onto the fitting end and flange.

---

The present invention relates to an improved heavy duty caster axle and integral grease fitting thereon and to a method of forming the axle.

A heavy duty caster axle or similar axle requiring greasing for proper operation is used or has possibilities for use for various items, such as for conveyors, lawn mowers, casters, wagons or automobiles and special screws that need to be greased. However, it has been found that previously used grease fittings on shafts or axles have the problem that small or sharp blows can knock the fitting of the shaft or axle due to the exposed nature of the fitting. The present invention solves this problem by forming the axle or shaft with a protective member acting to shield the fitting.

Among the objects of the present invention is the provision of a heavy duty shaft or caster axle with an integral grease fitting formed thereon. The grease fitting is integral with and positioned on the end of the shaft with an axial passage extending through the fitting and into the shaft to intersect with a diametrically extending passage through the shaft. A radial flange defines the end of the shaft and the grease fitting is formed beyond the flange; the flange being provided with a positioning lug on the side opposite the fitting.

Another object of the present invention is the provision of a shaft or caster axle having an integral grease fitting on one end and a protective cup or flange substantially encompassing the grease fitting. The protective cup is formed from a radial flange initially formed on the shaft prior to formation of the fitting with the flange formed to extend forwardly in a generally cup-shape about the fitting.

A further object of the present invention is the provision of a shaft or axle having an integral grease fitting and a protective cup formed from a separate member that is suitably secured to the fitting and to the radial flange on the shaft.

The present invention also comprehends the provision of a novel method of forming a shaft or axle and integral grease fitting from a cylindrical blank by the steps of forming the blank to form a flange separating a slightly reduced end from the remainder of the shaft, forming the reduced end to provide the exterior configuration of the fitting, drilling an axial passage and intersecting transverse passage in the shaft and forming the protective cup to encompass the fitting.

Further objects are to provide a construction of maximum simplicity, efficiency, economy and ease of assembly, and such further objects, advantages and capabilities as will later more fully appear and are inherently possessed thereby.

In the drawing:
FIG. 1 is a perspective view of a heavy duty caster axle and integral fitting with one form of protective cup.
FIG. 2 is a perspective view similar to FIG. 1 but showing another form of protective cup.
FIGS. 3 through 6 disclose the steps utilized on form the axle, integral fitting and protective cup.
FIG. 7 is an end view of the formed fitting and protective cup.
FIG. 8 discloses the last step in an alternate method having a separate washer forming the protective cup.

Referring more particularly to the disclosure in the drawing wherein are shown illustrative embodiments of the present invention. FIG. 1 discloses a heavy duty caster axle 10 having a central cylindrical shaft 11 threaded at one end 12 and provided with a reduced integral grease fitting 13 at the opposite end. A protetctive cup 14 is formed on the shaft adjacent the grease fitting 13 and has a radial flange portion 15 and a forwardly extending annular flange portion 16 encompassing the fitting.

The fitting 13 and shaft 11 are provided with an axial passage 17 extending from the end 18 of the fitting 13 into the shaft to intersect and terminate at a diametrically extending passage 19 opening at opposite sides of the shaft. The fitting 13 has an enlarged portion with tapering surfaces 21, 22 intersecting at a ridge 23, and a reduced diameter portion 24 adjacent the radial flange portion 15. Also a positioning lug or lugs 25 is formed on the radial flange portion 15 opposite the fitting 13.

Considering FIG. 2, this heavy duty caster axle 10a is identical to the axle 10 of FIG. 1 except for the shape of the protective cup 14a encompassing the integral grease fitting 13a. In this embodiment, the cup 14a is formed with a radial flange portion 15a and a forwardly extending generally annular and outwardly flared portion 26 acting to encompass and protect the fitting 13a. In both embodiments, the annular flange portion 16 and the flared flange portion 26 extend forwardly to a point slightly beyond the end 18 or 18a of the fitting 13 or 13a to provide substantially complete protection for the fitting.

FIGS. 3 through 7 disclose the steps utilized in the method of forming the axle with the integral fitting and the protective cup. The method is initiated by the cutting of a cylindrical blank of the proper length and diameter; which blank is formed to provide a shaft 31 (FIG. 3) with a reduced end 32 and an opposite reduced end 33 with a radial flange 34 separating the end 33 from the shaft 31. Also, a positioning lug 35 is formed at the intersection of the flange 34 and shaft 31 on the side opposite the end 33, and the end 33 is dimpled at 36 at the center thereof.

Then, the end 33 is formed to provide the exterior surface configuration of a grease fitting 37 (FIG. 4). An axial passage 38 is then drilled in the fitting and into the shaft 31, and a transverse passage 39 is drilled diametrically through the shaft to intersect the inner end of the passage 38 (FIG. 5). Next, the reduced end 32 is roll threaded to provide the thread 12 or 12a shown in FIGS. 1 and 2. Finally, the protective cup 41 (FIGS. 6 and 7) is formed by a rolling or other suitable operation to deform the outer portion of the radial flange 34 into a forwardly extending annular or flared flange 42 encompassing the fitting 37 and extending forwardly to a point slightly beyond the end 43 of the fitting.

FIG. 8 discloses an alternate method of forming the protective cup by the use of a formed cup-shaped washer 44 which has a central opening 45 so as to fit over the fitting 37 and is suitably secured onto the radial flange 34 and/or the reduced portion 46 of the grease fitting 37. Also, the washer could be suitably secured onto the appropriately formed outer edge of the radial flange.

While the improvement has been shown and described as being advantageously applicable to a heavy duty caster axle, it is not our desire or intent to unnecessarily limit the scope or the utility of the improved features by virtue of the illustrative embodiments.

Having thus disclosed our invention, we claim:

1. An elongated member forming an axle or shaft requiring grease for lubrication of an outer cylindrical surface, comprising a one piece member having an elongated cylindrical member, a grease fitting of a reduced diameter at one end of said cylindrical member, said cylindrical member having an axial passage opening at the end of the fitting and extending therefrom into the cylindrical member to intersect with a diametrically extending passage opening at at least one side of the cylindrical member, and a radial flange formed on the cylindrical member between the grease fitting and the cylindrical member and said one piece member having a generally annular flange portion secured to the cylindrical member and extending forwardly from the radial flange around and to a point slight beyond and encompassing the fitting to form a protective cup therefor.

2. An elongated member as set forth in claim 1, in which said encompassing flange portion is flared outwardly.

3. An elongated member forming an axle or shaft requiring grease for lubrication of an outer cylindrical surface, comprising an elongated cylindrical member, a grease fitting of a reduced diameter at one end of and integral with said cylindrical member, said member having an axial passage opening at the end of the fitting and extending therefrom into the member to intersect with a diametrically extending passage opening at at least one side of the member, an integral radial flange formed on the member between the grease fitting and the member, and a protective cup secured to said radial flange and generally encompassing the fitting, said grease fitting having an enlarged end portion and a reduced shank and said protective cup is a formed washer fitting onto the reduced shank and having a generally radial portion and a generally annular flange portion extending forwardly around said fitting to a point slightly beyond the fitting.

4. An elongated member as set forth in claim 3, in which said encompassing flange portion is flared outwardly.

References Cited

UNITED STATES PATENTS

| 1,166,309 | 12/1915 | Bacher | 308—120 |
| 1,733,762 | 10/1929 | Tisdall | 308—114 |
| 2,337,991 | 12/1943 | Hait | 308—114 |
| 2,853,346 | 9/1958 | Spangenberg | 308—121 |

MARTIN P. SCHWADRON, Primary Examiner

F. SUSKO, Assistant Examiner